United States Patent [19]
Kim

[11] Patent Number: 5,859,712
[45] Date of Patent: Jan. 12, 1999

[54] METHOD AND CIRCUIT FOR CORRECTING DISTANCE BETWEEN SENSORS IN IMAGE READING APPARATUS HAVING A PLURALITY OF LINE SENSORS

[75] Inventor: Eun-jin Kim, Seoul, Rep. of Korea

[73] Assignee: Samsung Electronics Co., Ltd., Kyungki-do, Rep. of Korea

[21] Appl. No.: 774,785

[22] Filed: Dec. 30, 1996

[30] Foreign Application Priority Data

Dec. 30, 1995 [KR] Rep. of Korea ................. 1995 69698

[51] Int. Cl.$^6$ ....................................... H04N 1/46
[52] U.S. Cl. .................... 358/504; 358/514; 358/524; 358/525
[58] Field of Search ..................... 358/514, 513, 358/482, 483, 504, 518, 523, 474, 505, 524, 525, 506, 487, 515; 348/263; 250/208.1; 355/38

[56] References Cited

U.S. PATENT DOCUMENTS

| | | | |
|---|---|---|---|
| 4,866,512 | 9/1989 | Hirosawa et al. | 358/514 |
| 4,891,690 | 1/1990 | Hasegawa et al. | 358/514 |
| 4,926,041 | 5/1990 | Boyd | 250/226 |
| 4,953,014 | 8/1990 | Takaragi | 358/528 |
| 5,019,703 | 5/1991 | Boyd et al. | 250/208.1 |
| 5,025,313 | 6/1991 | Parulski et al. | 358/514 |
| 5,113,067 | 5/1992 | Nakai et al. | 250/208.1 |
| 5,173,599 | 12/1992 | Setani | 250/208.1 |
| 5,237,400 | 8/1993 | Nashio et al. | 358/518 |
| 5,361,145 | 11/1994 | Hasegawa | 358/514 |
| 5,500,746 | 3/1996 | Aida | 358/518 |
| 5,642,207 | 6/1997 | Smitt | 358/483 |

FOREIGN PATENT DOCUMENTS 2239715  4/1996  United Kingdom .

*Primary Examiner*—Edward L. Coles
*Assistant Examiner*—Cheukfan Lee
*Attorney, Agent, or Firm*—Lowe Hauptman Gopstein Gilman & Berner

[57] ABSTRACT

A sensor-to-sensor distance correcting method and a circuit therefor in an image reading apparatus having a plurality of line sensors are provided. In the image reading apparatus including an image sensing means for converting optical image information into an electrical signal, an analog-to-digital converting means for converting a signal from said image sensing means into a digital signal, and a sensor-to-sensor distance correcting means, the means for correcting a distance between sensors comprises an extra-line corrector for correcting a registration error of an integer line unit among distances between sensors by housing sensor data for reading an image at a preceding position on a manuscript using red and green signal delay memories, delaying the housed sensor data until senor data at a next position is read, and reading the delayed sensor data when sensor data at the last position is read, and an intra-line corrector for correcting a decimal point unit registration error among the distances between sensors using a look-up table for housing interpolation kernel data. Therefore, a geometric image registration error generated on an input image caused by the distance between said image sensors is corrected thereby obtaining a high quality image.

13 Claims, 16 Drawing Sheets

METHOD AND CIRCUIT FOR CORRECTING DISTANCE BETWEEN SENSORS IN IMAGE READING APPARATUS HAVING A PLURALITY OF LINE SENSORS

BACKGROUND OF THE INVENTION

The present invention relates to an image reading apparatus having a plurality of line sensors, and more particularly, to a sensor-to-sensor distance correcting method for correcting a registration error of data read at a specific point of time due to a difference in spatial disposition intervals between the line sensors in a focusing optical system constituted by the plurality of line sensors, and a circuit therefor.

In general, a document image reading apparatus such as an image scanner, a digital copier or a facsimile, reads an image using a linear image sensor which arranges light sensing elements one-dimensionally. These image reading apparatuses have been developed such that its resolution and coloration have improved image quality, and the speed thereof has been increased to enhance their performances. Operations of these image reading apparatuses will be described referring to FIGS. 1A, 1B and 2.

Image reading apparatuses employing a reduction-type focusing optical system and an equivalent magnification-type focusing optical system shown in FIGS. 1A and 1B, respectively, read an image through a main-scan by radiating a light source to one-line image on a manuscript and focusing a reflective light on a linear sensor. As shown in FIG. 2, a two-dimensional manuscript image is input through a sub-scan wherein a line image is read by transferring the linear sensor to a relative next-line position based on the manuscript. At this time, an optical apparatus such as a lens is required between the manuscript and the linear sensor to optically adjust the widths of the manuscript and the linear sensor. In general, when the width of the manuscript is less than that of the linear sensor, the optical apparatus is referred to as a reduction optical system (FIG. 1A), and when the width of the manuscript is the same as that of the linear sensor, it is called an equal-magnification optical system (FIG. 1B). The image reading apparatus is classified into two focusing methods.

The resolution of the image reading apparatus is determined with respect to each of the main scan and sub-scan directions. Thus, the resolution of the main scan direction is determined by the number of light sensing elements in the linear sensor and a reduction ratio of an optical system. Also, the resolution of the sub-scan direction is determined by the distance by which the position of the image sensor is moved relative to the manuscript image.

In order to accomplish a high resolution in the main scan direction, there are methods of: (1) increasing the number of light sensing elements of the sensor corresponding to a unit length on the manuscript by improving the integration density of the sensor while the reduction ratio of the optical system is maintained; and (2) focusing an image by increasing the number of light sensing elements and decreasing the reduction ratio without a change in the size of each light receiving element. In the former method, since a light receiving area of each light sensing element on which a unit pixel on the manuscript is focused is made narrow, the sensitivity of the light sensing element must be improved significantly, the light amount of the irradiated light source must be increased, or a light sensing time (or an exposure time) must be prolonged. In this method, the total number of light sensing elements must be increased by three times in red (R), green (G) and blue (B) according to the coloration, which in practice is not possible. Meanwhile, in the latter method, though the length of the sensor is greatly increased to thus exceed the diameter of an existing semiconductor wafer, there is a problem in fabricating the sensor and in the yield thereof.

Thus, in order to overcome the above problems and accomplish a colorful, high resolution and high speed image reading apparatus, in the case of the reduction-type focusing optical system, sensors are used being isolated in a sub-scan direction by differing the positions of the red, green and blue R, G and B according to a photosensitive wavelength band, as shown in FIG. 3A. Also, in the case of the equal magnification-type focusing optical system, the sensors are divided into a proper size and processed, and then disposed in a zigzagging manner as shown in FIG. 3B. Such an alternative measure has been widely employed since it is very realistic and economical enough to extensively apply a technology accumulated in a conventional black and white image reading apparatus and an associated constituent technique. However, in this method, the respective sensors are disposed in a zigzagging manner with predetermined distances based on the manuscript such that the geometrical positions of images read by the sensors at a specific moment are different from each other, whereby a correction via a proper method is required.

In general, the interval between the sensors maintains the relationship between a multiple of an integer of the width and the length of each light receiving element which are determined by a resolution in the main scan direction provided by the sensors. Accordingly, a reading registration error on the manuscript due to the intervals between the sensors can be corrected by a relatively simple means by corresponding the reading registration error to a multiple of an integer of sub-scan line. That is, when the resolution in the main scan direction equals that in the sub-scan direction, or when the resolution in the sub-scan direction is a multiple of an integer of that in the main scan direction, a registration correction due to the interval difference between the sensors is performed in a sub-scan line unit. A method for simply correcting the registration error using a line delay memory is already known. However, this method is not flexible in an actual case. In a document image reading apparatus, the resolutions in the main scan and sub-scan directions are arbitrarily and finely adjusted so that various magnification conversions are possible according to the relationship with an output apparatus. Accordingly, since the reading registration error in the sub-scan direction due to the intervals between the sensors is not always correctly expressed as an integral relation in a sub-scan line depending on an arbitrary magnification conversion, registration occurs to a certain extent so that an additional correcting means is necessary.

As described above, means for adaptively correcting a registration error in accordance with the arbitrary magnification conversion in the main scan direction actually becomes very essential and necessary for obtaining a high quality image.

Meanwhile, as shown in FIG. 4, the U.S. patent applications Ser. Nos. 4,926,041, 5,019,703, 5,113,067, 5,173,599 and 5,361,145 propose a method for correcting geometrical distortion due to the interval difference between the sensors by using dichroic filters (or blazed diffraction mirrors or beam splitters) having different refractive indices as reflective mirrors to focus a line image at an identical position on a manuscript to each sensor. However, the above proposed method cannot be applied to the case in which each sensor is disposed in a zigzagging manner in the configuration of the equal magnification optical system as shown in FIG. 1B. Also, since the above method requires great care and elaborateness in a planarization degree, the thickness and an assembling angle for fabrication and assembly of the reflective mirror as a dichroic means in order to perform an accurate correction, the reflective mirror is not an easy means.

Meanwhile, as shown in FIG. 5, the U.S. Pat. No. 4,953,014 is applicable to all of the sensors shown in FIGS. 1A and 1B. However, since the interpolator is a linear interpolator constituted only by a multiplier and an adder as shown in FIG. 6, it cannot avoid an aliasing phenomenon and a jagged error on a delicate image such as a star target shape, thereby degrading image quality. That is, a limit due to the linear interpolation is inevitable. Furthermore, the structure of the delay memory is incomplete since it does not provide any propositions about an appropriate method for optimizing a memory capacitance and operating the memory at a high speed.

SUMMARY OF THE INVENTION

Accordingly, to solve the above problems, in an image reading apparatus having a plurality of line sensors, it is an object of the present invention to provide a method for correcting the distance between sensors wherein various algorithms such as a nearest neighbor algorithm, a linear algorithm, a cubic algorithm, etc., can be used as an interpolation algorithm for determining an image quality of an interpolation image.

It is another object of the present invention to provide a most appropriate circuit for performing the method for correcting the distance between sensors.

To accomplish the first object, there is provided a method for correcting a distance between sensors in an image reading apparatus having a plurality of line sensors, the method comprising the steps of: an extra-line correcting step for correcting a registration error of an integer line unit among distances between sensors by housing sensor data for reading an image at a preceding position on a manuscript using red and green signal delay memories, delaying the housed sensor data until senor data at a next position is read, and reading the delayed sensor data when sensor data at the last position is read; and an intra-line correcting step for correcting a decimal point unit registration error among the distances between sensors using a look-up table for housing interpolation kernel data.

To accomplish the second object, there is provided, in an image reading apparatus having a plurality of line sensors including an image sensing means for converting optical image information into an electrical signal, an analog-to-digital converting means for converting a signal from the image sensing means into a digital signal, and a sensor-to-sensor distance correcting means, a circuit for correcting a distance between sensors comprising: an extra-line corrector for correcting a registration error of an integer line unit among distances between sensors by housing sensor data for reading an image at a preceding position on a manuscript using red and green signal delay memories, delaying the housed sensor data until senor data at a next position is read, and reading the delayed sensor data when sensor data at the last position is read; and an intra-line corrector for correcting a decimal point unit registration error among the distances between sensors using a look-up table for housing interpolation kernel data.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

The present invention provides a configuration of a hardware which can use various algorithms such as a nearest neighbor algorithm, a linear algorithm and a cubic algorithm as an interpolation algorithm for determining an image quality of an interpolating image and a method for real-time processing and economical realization according to the configuration thereof.

Figure 1A:
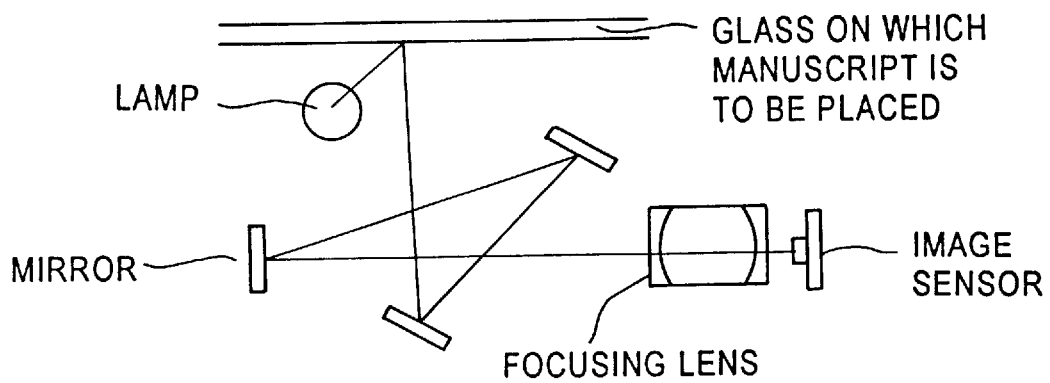
FIGS. 1A and 1B show the configurations of a reduction-type focusing optical system and an equal magnification-type focusing optical system, respectively.
Figure 3A:
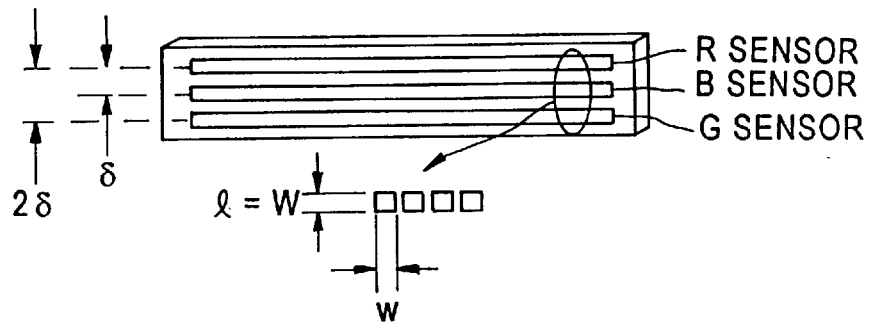
FIGS. 3A and 3B are views showing the configuration of a reduction-type linear image sensor and an equal magnification-type linear image sensor, respectively.
Figure 7:
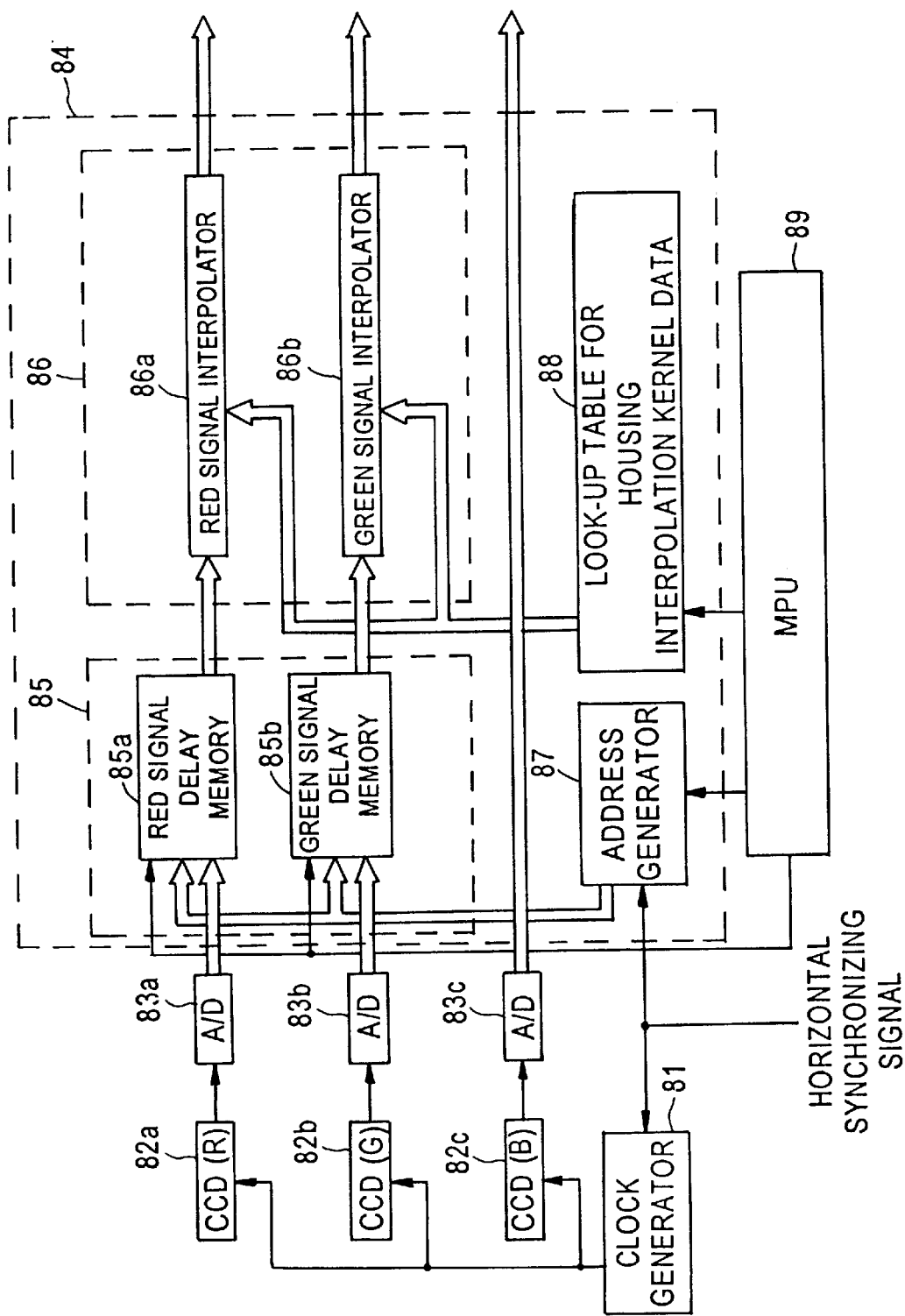
FIG. 7 shows a circuit for correcting the distance between sensors using a reduction-type linear image sensor in an image reading apparatus according to a first embodiment of the present invention.

FIG. 7 shows a circuit for correcting a distance between sensors using a reduction-type focusing optical system shown in FIG. 1A and a sensor structure shown in FIG. 3A, according to a first embodiment of the present invention.

The sensor-to-sensor distance correcting circuit shown in FIG. 7 comprises a clock generator 81, image sensors 82a, 82b and 82c, analog-to-digital (A/D) convertors 83a, 83b and 83c, a sensor-to-sensor distance correcting portion 84 and a microprocessor unit (MPU) 89. The sensor-to-sensor distance correcting portion 84 comprises an extra-line corrector 85, an intra-line corrector 86, an address generator 87 and a look-up table for housing interpolation kernel data 88. Here, the extra-line corrector 85 includes a red signal delay memory 85a and a green signal delay memory 85b, and the intra-line memory 86 includes a red signal interpolator 86a and a green signal interpolator 86b.

Figure 1B:
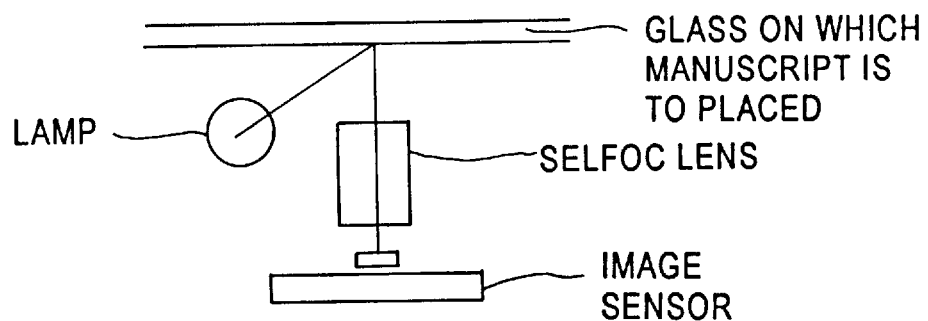
Figure 3B:
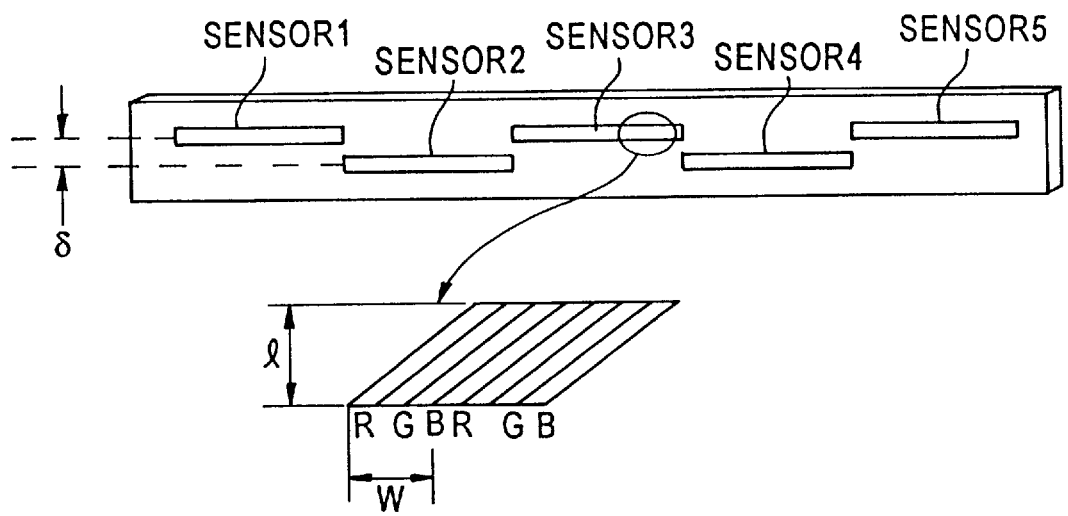
Figure 4:
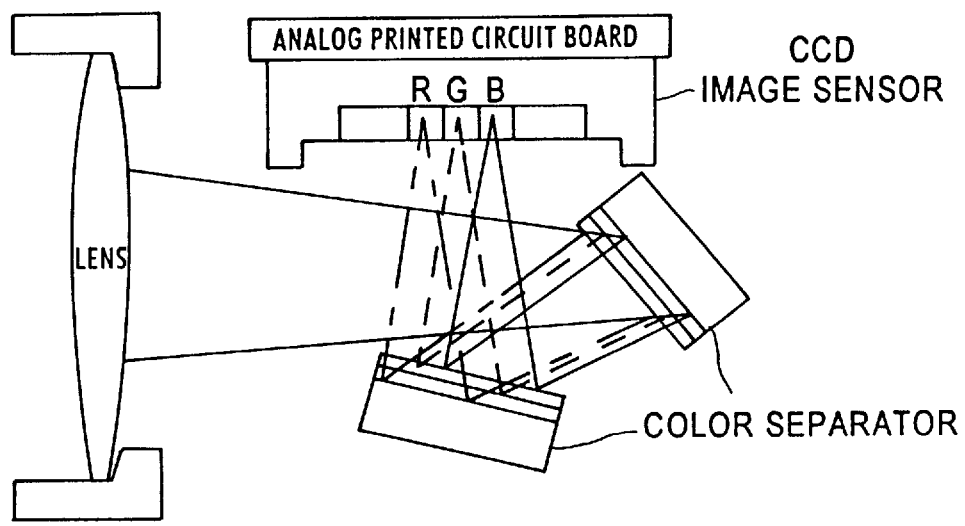
FIG. 4 shows a conventional circuit for correcting the distance between sensors using a dichroic means in an image reading apparatus.
Figure 5:
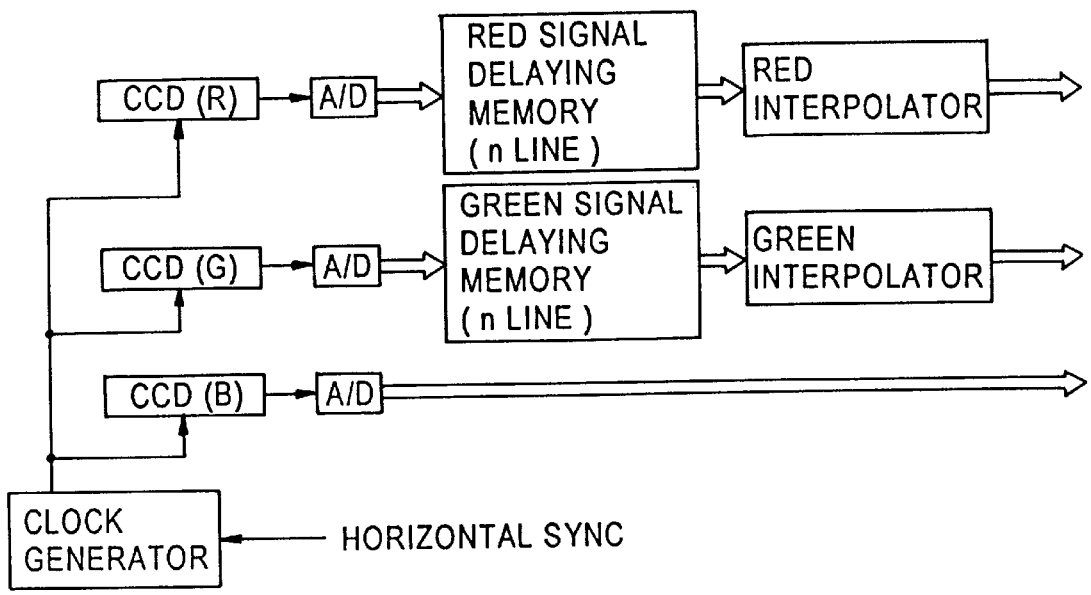
FIG. 5 shows a conventional circuit for correcting the distance between sensors using a linear interpolating means in an image reading apparatus.
Figure 6:
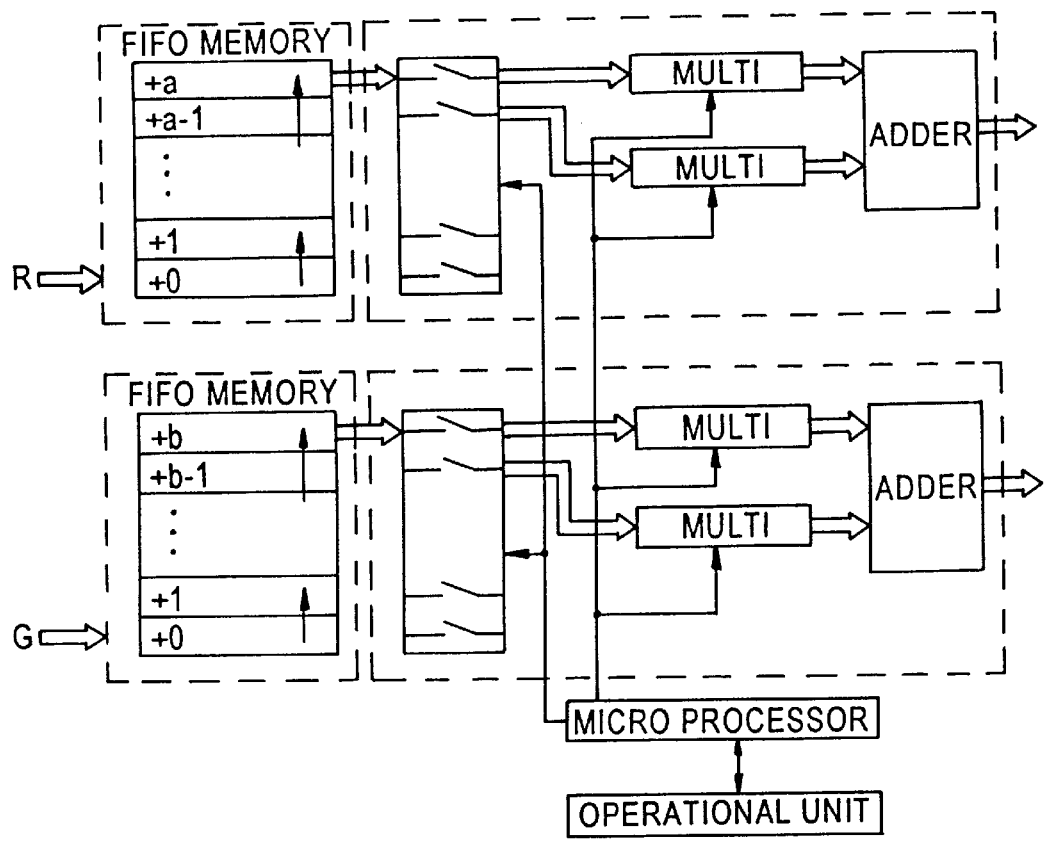
FIG. 6 is a detailed configuration view of the interpolators shown in FIG. 5.
Figure 8:
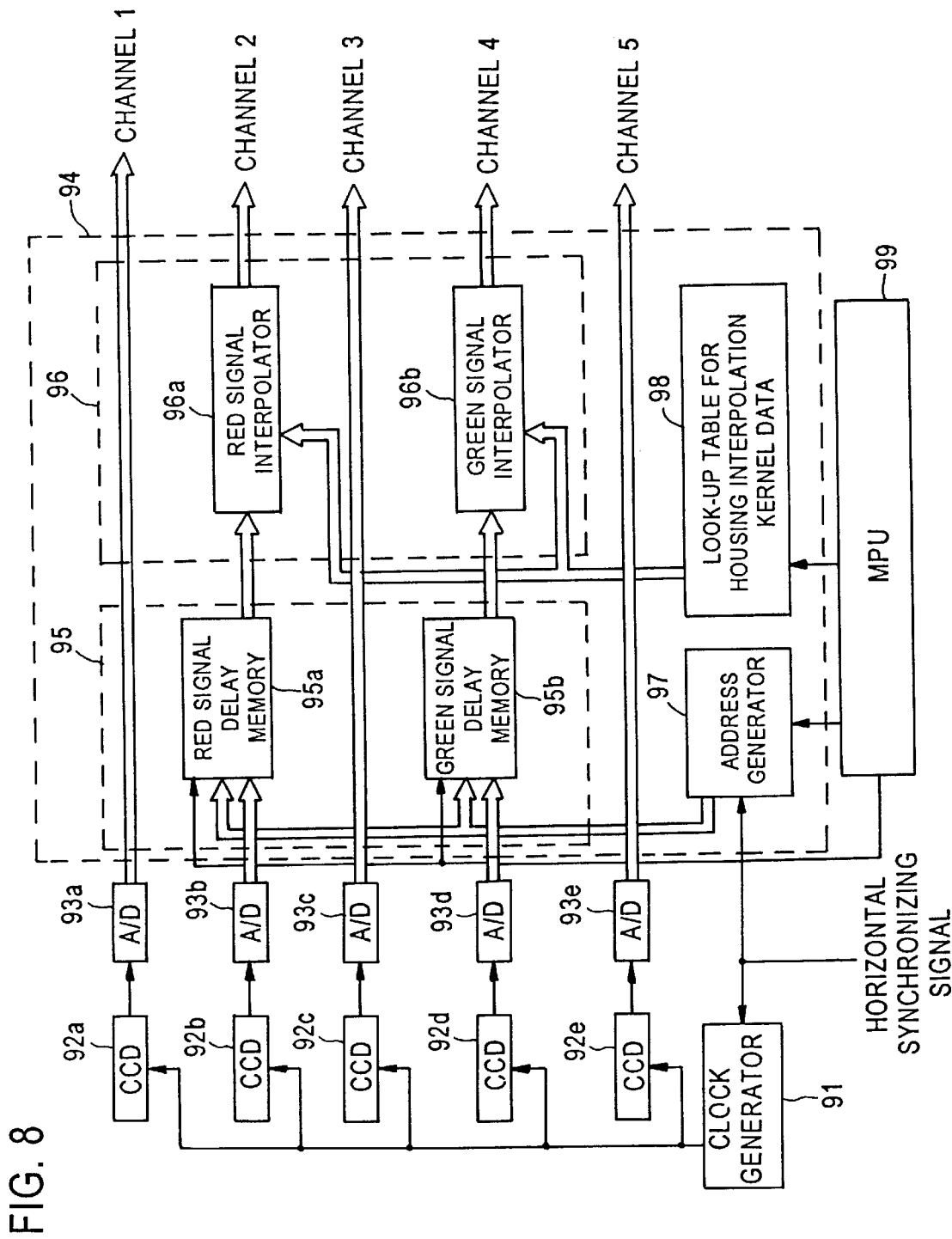
FIG. 8 shows a circuit for correcting the distance between sensors using an equal magnification-type linear image sensor in an image reading apparatus according to a second embodiment of the present invention.

FIG. 8 shows a circuit for correcting a distance between sensors using an equal magnification-type focusing optical system shown in FIG. 1B and a sensor structure shown in FIG. 3B, according to a second embodiment of the present invention.

The sensor-to-sensor distance correcting circuit shown in FIG. 8 comprises a clock generator 91, image sensors 92a, 92b, 92c, 92d and 92e, analog-to-digital (A/D) convertors 93a, 93b, 93c, 93d and 93e, a sensor-to-sensor distance correcting portion 94 and a microprocessor unit (MPU) 99. The sensor-to-sensor distance correcting portion 94 comprises an extra-line corrector 95, an intra-line corrector 96, an address generator 97 and a look-up table for housing interpolation kernel data 98. Here, the extra-line corrector 95 includes a red signal delay memory 95a and a green signal delay memory 95b, and the intra-line memory 96 includes a red signal interpolator 96a and a green signal interpolator 96b.

The structural difference between the circuits of FIGS. 7 and 8 is due to the sensor structure. However, there is no difference in the fundamental principle and method for correcting the distance between sensors. Accordingly, the present invention will be described with reference to FIG. 7.

Referring to FIG. 7, the clock generator 81 controls line unit exposure light of the CCD image sensors 82a, 82b and 82c using a horizontal synchronizing signal (line synchronizing signal), i.e., a scanning control signal (HSYNC) in a sub-scan direction, output from the MPU 89, and generates a pixel clock signal (PCLK) for outputting an accumulated image signal from individual light sensing elements of the CCD image sensors 82a, 82b and 82c. That is, the pixel clock signal (PCLK) in a main scanning direction is generated by the scanning control signal (HSYNC) in a sub-scanning direction.

The CCD(R) 82a, CCD(B) 82b and CCD(G) 82c, as image sensors shown in FIG. 3A, are spaced by a predetermined distance apart from each other and converts image signals according to red, blue and green three wavelength zones into electrical signals in a visible ray area. The analog-to-digital (A/D) convertors 83a, 83b and 83c convert signals output from the CCD image sensors 82a, 82b and 82c into digital signals. Then, the sensor-to-sensor distance correcting portion 84 receives output signals of the A/D convertors 83a, 83b and 83c.

In the sensor-to-sensor distance correcting portion 84, the extra-line corrector 85 for correcting a registration error of an integer line unit houses data of a color signal (sensor) for reading an image at a preceding position, delays the housed data until the following color signal is read, and then reads the delayed data when the last color signal is read, thereby performing a correction of the line unit registration error. The most recent color signal read during a scanning operation on the basis of a certain position on a manuscript becomes the basis of an entire image reading position, and does not need a delay memory means. The present invention mentions the CCD(G) as the last read color signal. However, the CCD(G) depends on the structure of the sensor being used.

Meanwhile, the intra-line corrector 86 for correcting a registration error of below a line, i.e., a decimal point unit improves upon the problem of a reading registration error in a sub-scan direction due to the distance between sensors not correctly corresponding to a scanning line unit according to various scan conditions or of the sharpness of an image being degraded during a sub-scan wherein a sensor is minutely moved within a scan line on the basis of the manuscript according to scan characteristics. The intra-line corrector 86 is operated by the look-up table 88 for housing interpolation kernel data according to various interpolating algorithms which will be described later.

The interpolation kernel data is previously calculated by the MPU 89 according to a selected interpolation algorithm, the distance between sensors, and the length in the sub-scan direction and indicated variable magnifications of the individual light sensing elements in the sensors, and then stored in the look-up table 88 so that a computational bottle-neck phenomenon during image reading is prevented.

Now, first and second embodiments of the extra-line correctors 85 and 95 shown in FIGS. 7 and 8, respectively, will be described in more detail referring to FIGS. 9 and 10.

Figure 9:
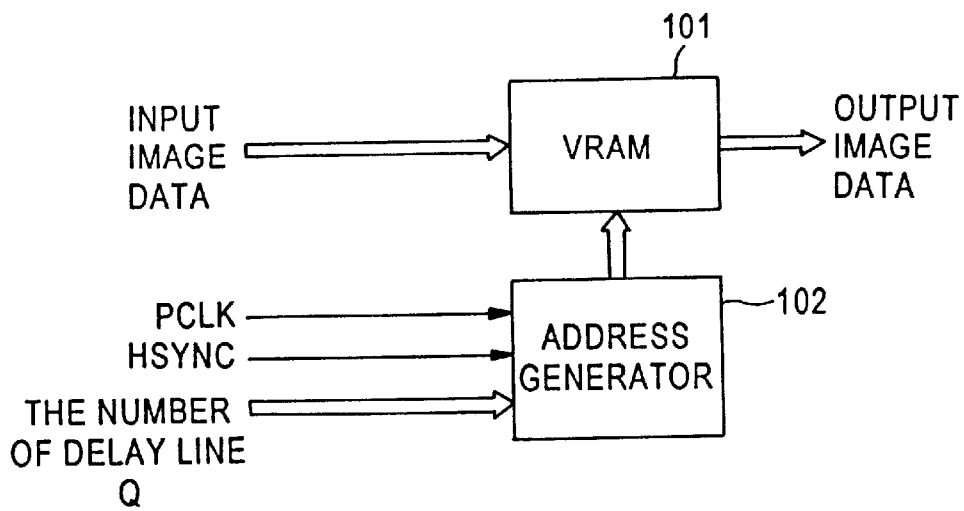
FIG. 9 is a configuration view of an extra-line corrector upon using a video random access memory (VRAM) in FIGS. 7 and 8 according to the first embodiment.
Figure 12:
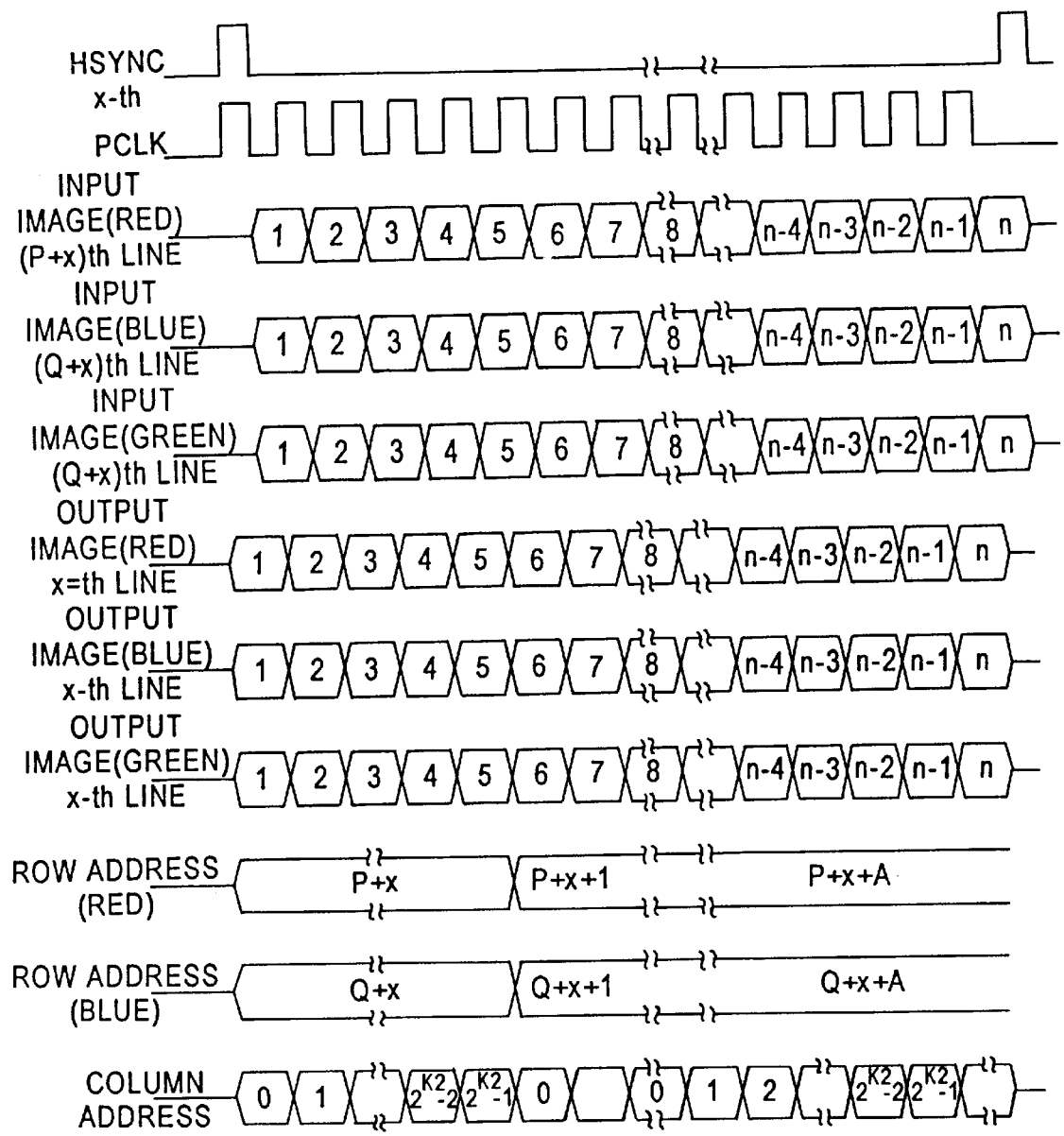
FIG. 12 is an operation timing view of an extra-line corrector shown in FIGS. 9 and 10.
Figure 13:
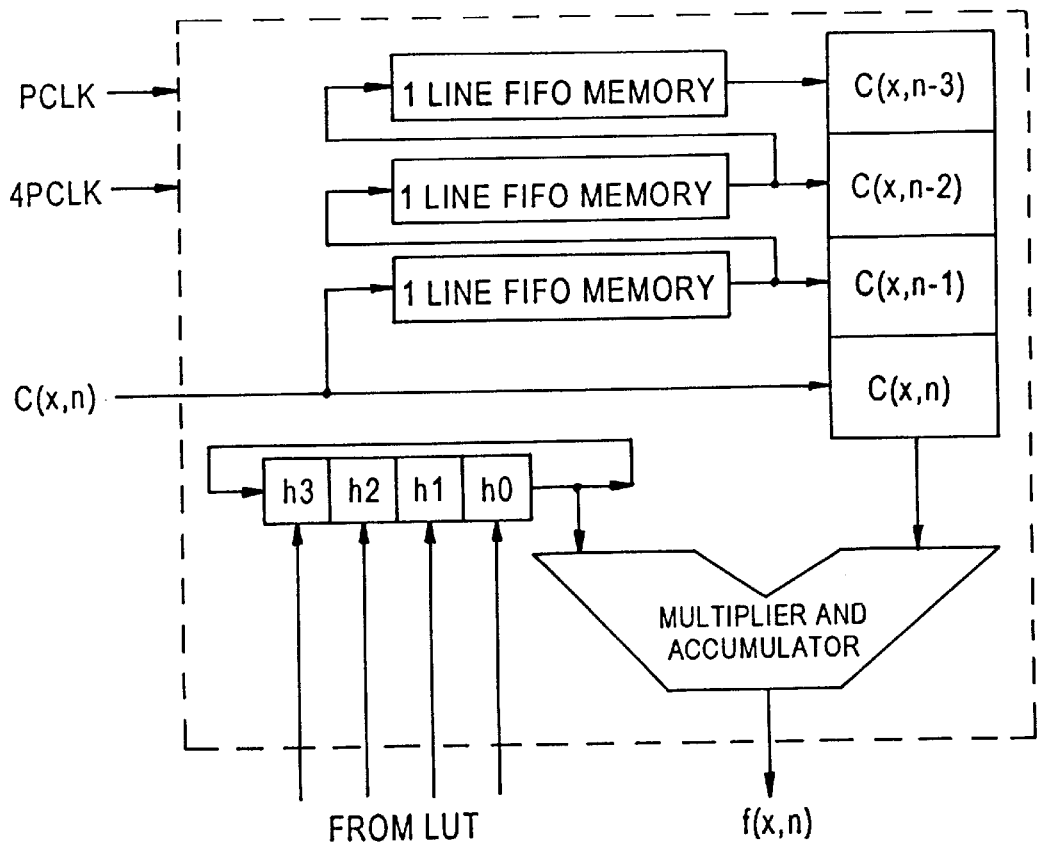
FIG. 13 is a detailed configuration view of the interpolator shown in FIGS. 7 and 8.

The extra-line corrector 85 shown in FIG. 9 employs a video RAM (VRAM) 101 constituted by a FIFO memory or a dual port memory as a delay memory. The extra-line corrector 95 shown in FIG. 10 employs a typical static RAM (SRAM) 113 as a delay memory. An operational waveform diagram of the extra-line correctors 85 and 95 is shown in FIG. 12 as the output image data.

Figure 10:
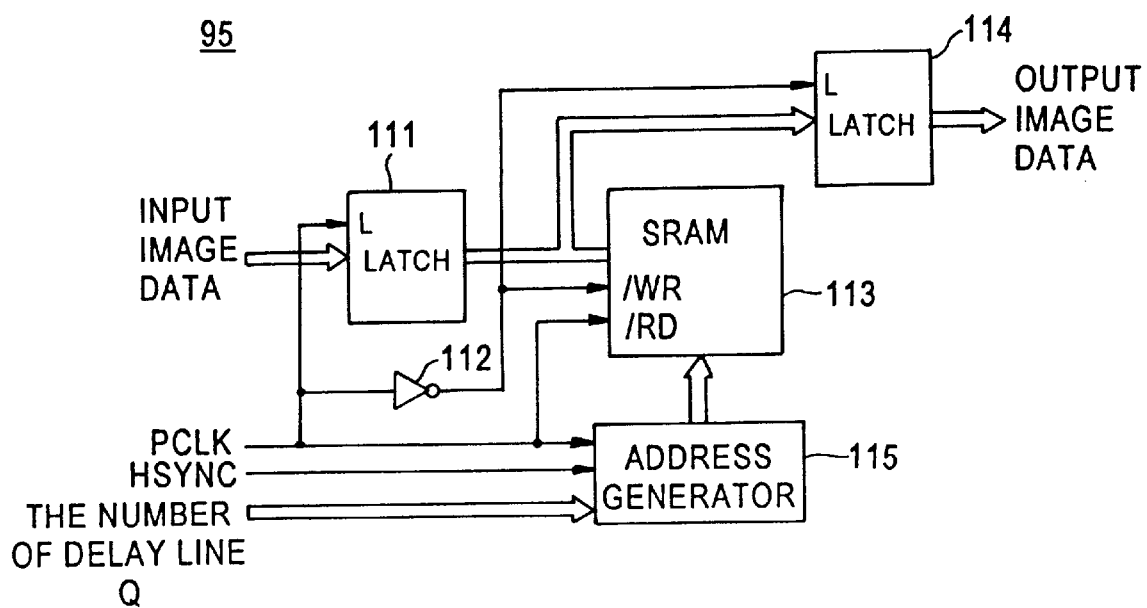
FIG. 10 is a configuration view of an extra-line corrector upon using a static random access memory (SRAM) in FIGS. 7 and 8 according to the second embodiment.
Figure 11:
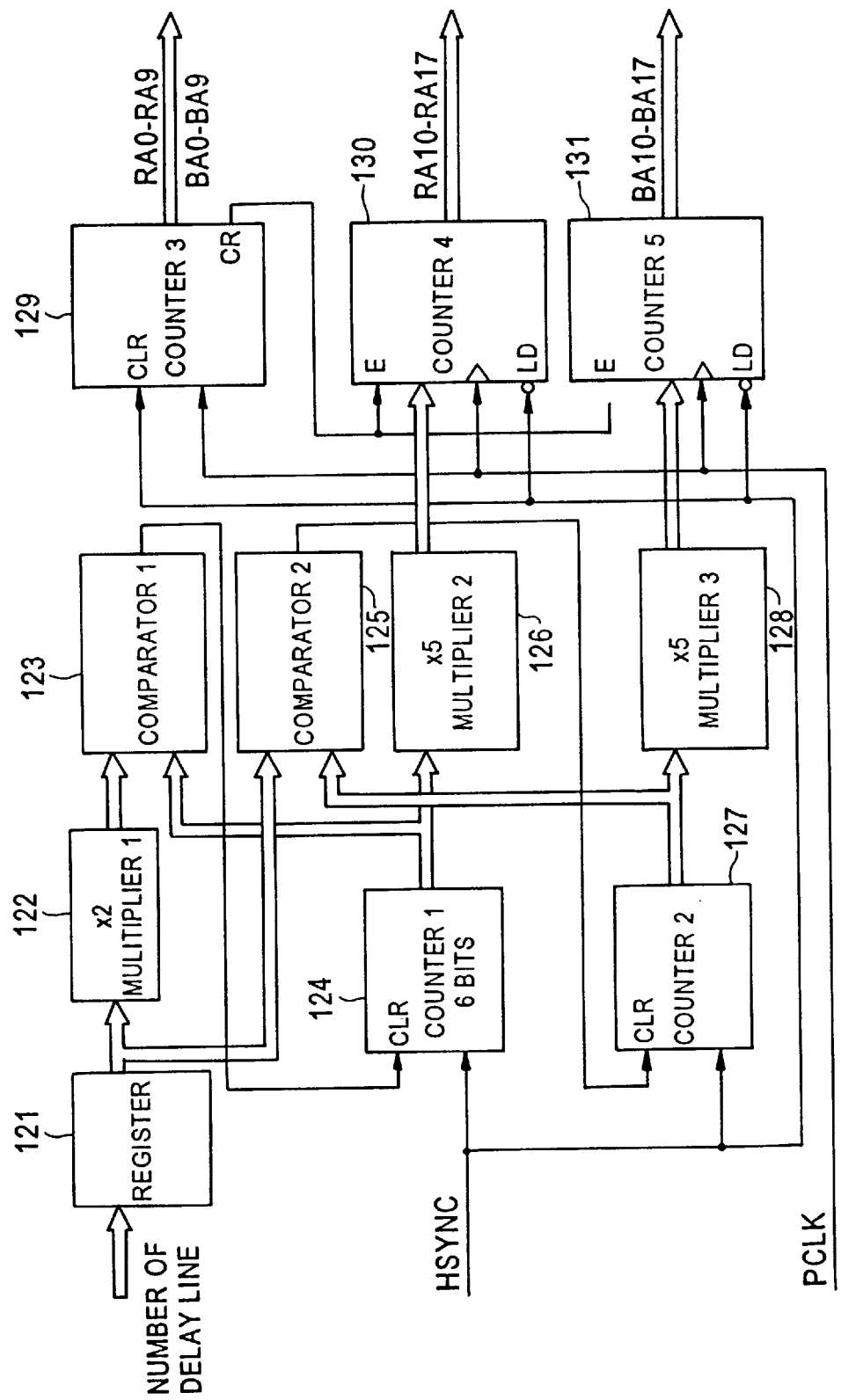
FIG. 11 is a detailed configuration view of an address generator shown in FIGS. 9 and 10.

FIG. 11 is a block diagram of an embodiment of the address generators 102 and 115 shown in FIGS. 9 and 10. The address generator includes a resistor 121, three multipliers 122, 126 and 128, two comparators 123 and 125, and five counters 124, 127, 129, 130 and 131.

Now, an operation of the present invention will be described with reference to the attached drawings as follows.

First, the extra-line correction will be described.

Figure 2:
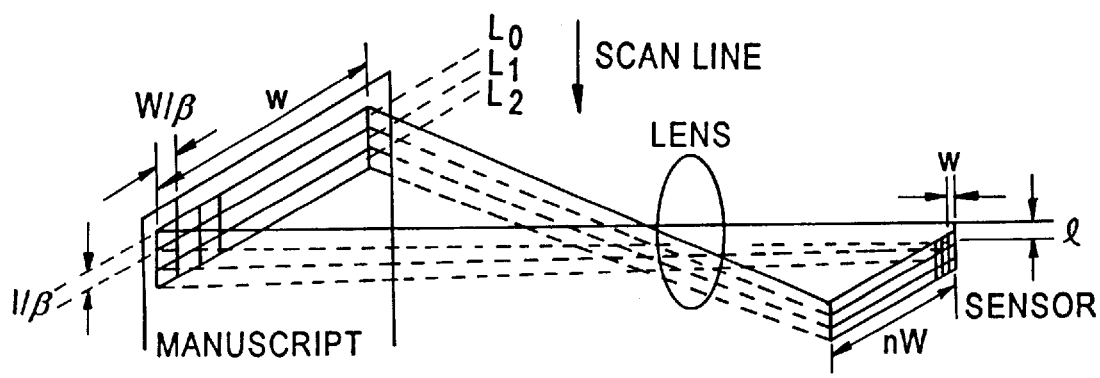
FIG. 2 shows the relationship of relative positions between a manuscript image and an image sensor according to a sub-scan.

A focusing optical system for reading a manuscript image focuses an image onto individual light sensing elements in the image sensors, and is divided into a reduction type (see FIGS. 1A and 3A) and an equivalent magnification type (see FIGS. 1B and 3B) on the basis of the image sensors. The reduction-type focusing optical system has image sensors whose lengths in the main scan direction (the widths nw of the sensors in FIG. 2) are narrower than the width W in FIG. 2 of the manuscript. The main function of the lenses of the reduction-type focusing optical system is to optically combine the image sensor with the manuscript. The reduction-type color image sensor has a structure in which n light sensing elements each having a predetermined width w and length l (l=w) in red, green and blue are disposed one-dimensionally, as shown in FIG. 3A. Thus, the width of the sensor becomes nw. Here, the width and the length of the respective light sensing elements in each sensor are set to be equal l=w. However, the width and the length of the respective light sensing elements are not required to be the same, but in general, they are identical. Thus, the light receiving area of each light sensing element is $W^2$. In order to obtain an image reading apparatus having a high resolution, the number (n) of light sensing elements in the respective sensors should be increased, and, accordingly, the widths w thereof should be made narrower or a reduction ratio should be regulated. The reduction in the width of the sensor results in reduction of the light receiving area, and thus degrades the sensitivity of the sensor so that it becomes a decisive hinderance in accomplishing a high speed operation of the sensor. Also, the increase in the number of light sensing elements without a change in the width thereof results in an increase in the width of the image sensor, which causes many disadvantages in the fabrication of the sensor and requires a large lens in the configuration of the focusing optical system. Accordingly, in order to substantially overcome the above-described problems, a color sensor employs a structure in which sensors in R, G and B colors are arranged two-dimensionally being spaced at an interval of δ (a distance between sensors), as shown in FIG. 3B. The arrangement sequence of the sensors in each color is not part of the technique. The sensors in the respective colors are disposed with intervals without being arranged at an identical height as a method for overcoming the above problems. The sensors in colors have been typically arranged in an order of R, G and B.

However, an order of R, B and G is recently being employed to reflect a chromatic aberration feature of lenses. A structure where color sensors are symmetrical on the basis of a middle sensor at an interval of δ as in FIG. 3B has been generally employed. The distance δ between sensors is directly linked to the capacitances P and Q of the delay memory shown in FIGS. 9 and 10.

In FIG. 7, the B sensor precedes by δ and the R sensor precedes by 2δ on the basis of the G sensor. That is, in the sensor structure of FIG. 3A, the G sensor placed lowest does not need a delay memory, and the R and B sensors are delayed by a corresponding line to the delay memory and corrects geometrical distortion due to a relative distance between the sensors. Here, the relationship between the sensor-to-sensor distance and the delay memory capacitances P and Q can be expressed by equation 1.

$$P = M \frac{2\delta}{w} \qquad (1)$$

$$Q = M \frac{\delta}{w}$$

wherein M denotes a variable magnification in a sub-scan direction, δ is a distance between the sensors, and w is a length of an individual light sensing element in each sensor.

In general, a correction due to the distance between sensors can be simply carried out by setting the sensor-to-sensor distance to a multiple of integer of the length of the light sensing element. Also, an effort to reduce the sensor-to-sensor distance has been made to minimize a required capacitance of the memory, but, it is impossible to eliminate the basic sensor-to-sensor distance generated.

However, in actual application, a complete correction due to the sensor-to-sensor distance using a delay memory is not performed according to the variable magnification (magnification transform) M. That is, the correction using the delay memory can be performed only in a line unit of an integer, and is limited to when the equation 1 can preserve an integer relationship.

In an actual image reading apparatus, the magnification transformation is required to be processed by an arbitrary variable magnification, and a soft image process should be enabled by independently performing the variable magnifications in the main scanning direction and the sub-scanning direction. Accordingly, the magnification transformation in the main scanning direction and the sub-scanning direction are made to be performed independently, and the variable magnification is made to be arbitrarily regulated by a unit of 1% within the range of 25% to 400%. Thus, the correction due to the distance between sensors requires the extra-line correctors 85 and 95 using a delay memory and intra-line correctors 86 and 96 for correcting a decimal point as shown in FIGS. 7 and 8.

Even in the equivalent magnification type (FIG. 1B), there is a difference in that the individual sensors constituted by alternating each light sensing element according to colors are arranged in two lines as show in FIG. 3B. However, the arrangement structure results in generation of the sensor-to-sensor distance, and a correction of the sensor-to-sensor distance is similar to that in the aforementioned reduction type.

Figure 15:
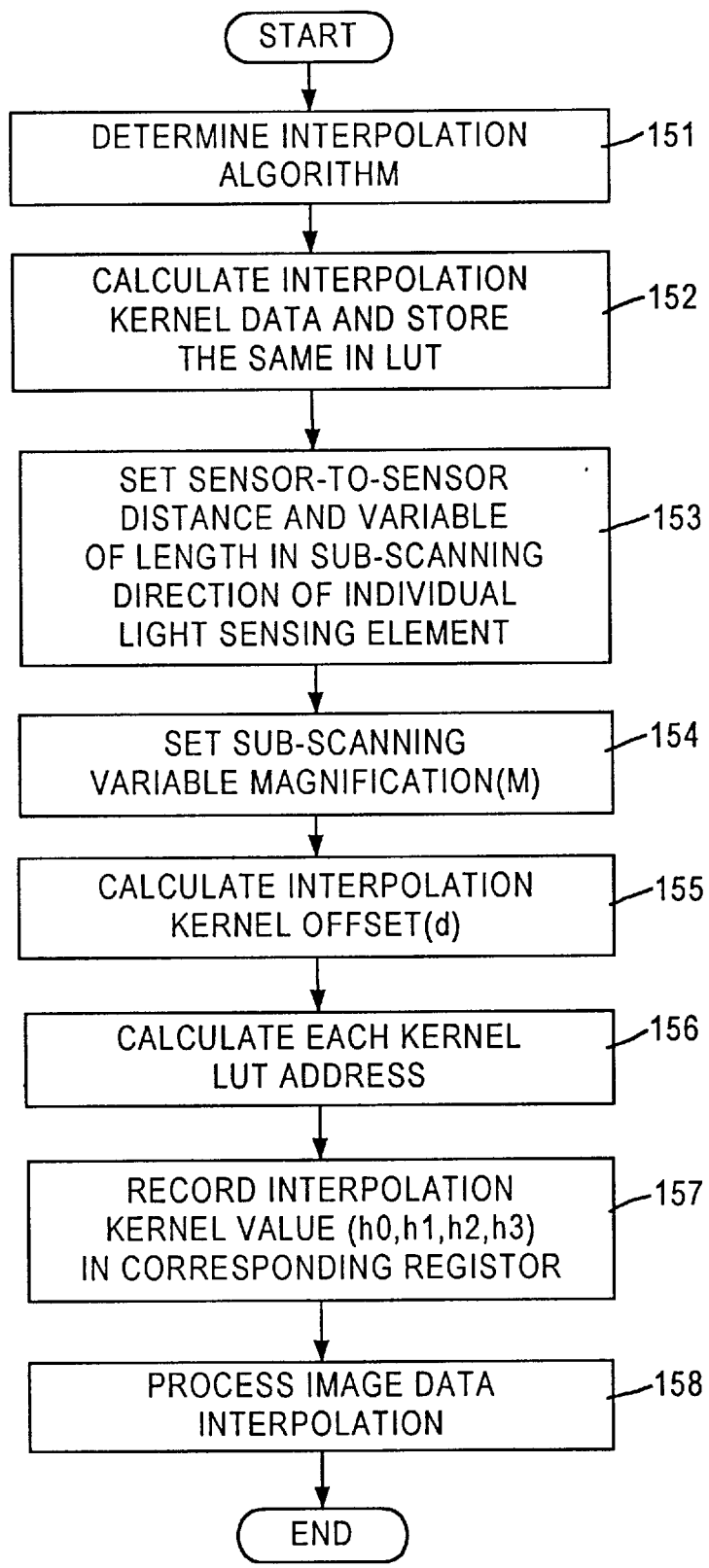
FIG. 15 is a flowchart for explaining a sensor-to-sensor distance correcting method according to the present invention in an image reading apparatus.
Figure 16:
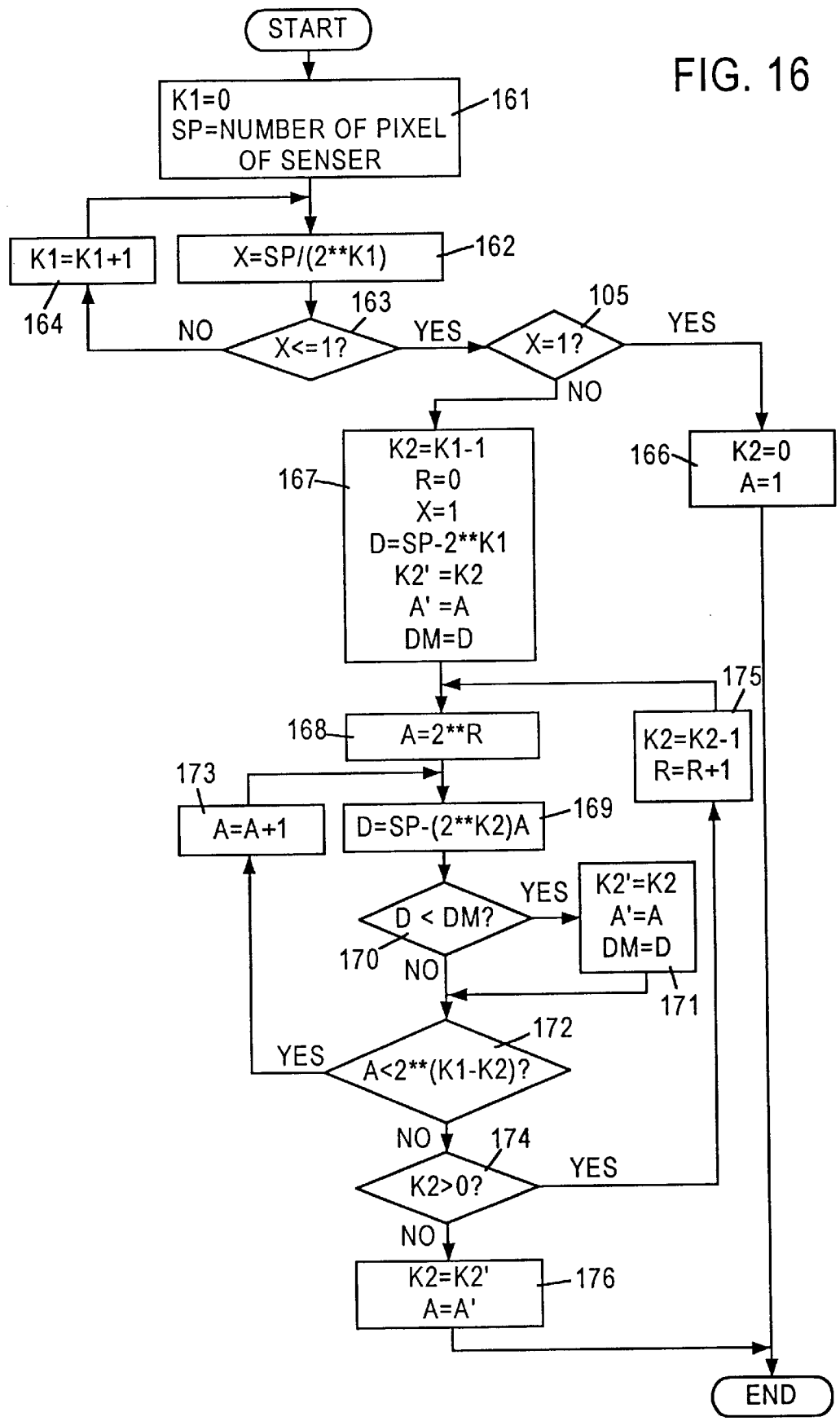
FIG. 16 is a flowchart for explaining a process for producing an operation variable in the address generator shown in FIG. 11.

FIG. 15 is a flowchart showing an entire operation of a sensor-to-sensor distance correcting method according to the present invention in the image reading apparatus having a plurality of line sensors. FIG. 16 is a flowchart showing a process for outputting operational variables of the extra-line correctors 85 and 95. Here, the operational variable denotes an initial value of each portion in the structure of the delay memory address generators 87, 97, 102 and 115 of FIGS. 7, 8 and 11. A delay memory address can be an offset address, a column address and a low address in accordance with the number of delay lines calculated in the equation 1, and operates in a cycle by a period of the number of delay lines. That is, a current scan line is referred to as a period of the number of delay lines and the offset address of the delay memory. Data of each single scan line is divided into a column address and a low address and mapped. That is, the data of each scan line is comprised of a predetermined column data unit, and the size of each column data is set to an involution unit of 2 (i.e., $2^{K2}$), thereby simplifying the configuration of the address generators 87, 97, 102 and 115. Accordingly, the size of the column data is set to a value satisfying the relationship of the following formula 2 among involution values of 2 within the size of a scan line data (n pixel=SP). Here, the size of the scan line is indicated by SP, and A denotes a natural number equal to or greater than 1.

$$SP \leq 2^{k1}$$

$$SP \leq A2^{k2} \qquad (2)$$

$$K1 < K2$$

The conditions of the formula 2 simplifies the configuration of the address generators 87, 97, 102 and 115. Accordingly, if the number of pixels of the scan line is an involution value of 2, the configuration thereof is greatly simplified. However, in reality, this is usually not the case. Thus, a new variable D as in the following equation 3 is set to the conditions of the formula 2. Also, a condition of minimizing the value D is added to determine the value A.

$$D = SP - A2^{k2} \qquad (3)$$

The minimization of the value D in the equation 3 is a condition of minimizing a null space, which optimizes an entire capacitance of the delay memory.

For example, in an image sensor capable of reading a A3-sized document with a resolution of 400 DPI, the number of one-line pixels is 5000. For this, an address should be alloted by 13-bit, i.e., K1=13, which makes an efficient application of the memory difficult. In this case, if the column address is set to 9-bit (i.e., K2=9) and the low address A is set to 5, the memory can be efficiently employed and the address generators 87, 97, 102 and 115 can be easily attained.

FIG. 16 is a flowchart generalizing a process for obtaining these operational variables. Here, the obtained variable K2 becomes an allocated bit of a column-address generator (not shown) and counts from 0 to -1. The variable K2 becomes a column-address value of the delay memory. A becomes a low address counted depending on a carry signal of a column-address counter (not shown) with the offset address set as an initial value. Here, the offset address is calculated in an offset address calculator (not shown), input as a free-set value of a low-address counter (not shown), and calculated as in the following equation 4.

$$P' = mod\left(\frac{L}{P}\right)A \qquad (4)$$

$$Q' = mod\left(\frac{L}{Q}\right)A$$

wherein L denotes the frequency of a sub-scanning, i.e., the frequency of generation of HSYNC, an operator mod(.) denotes the remainder, A is a value obtained in the flowchart of FIG. 15, and P and Q are values obtained in the formula 1. Here, the remainders obtained by dividing the sub-scanning frequency into P and Q obtained in the formula 1, respectively, are adopted for utilizing the delay memory circulated in the respective cycles of P and Q.

When a typical static RAM (SRAM) is used as the delay memory, the address space is allocated one-dimensionally. In a two-dimensional method as described above, the low address is alloted to an upper address bit of the delay memory, and the column address is alloted to a lower address bit. Meanwhile, when the delay memory requires a refresh operation as in a dynamic RAM (DRAM), the address of the memory is alloted to the low and column addresses in the two-dimensional way. Here, each of the low and column addresses must be alloted to a corresponding address.

Now, the definition of an interpolation will be given. The interpolation is a process for determining an interval value existing between samples and is obtained by fitting to a consecutive function through discrete input samples. Thus, even though an input value is not defined at an arbitrary location, a presumption is probable. If a sampling is to generate an infinite bandwidth signal from a band-limited signal, the interpolation can be referred to as an operation of reducing a bandwidth of a signal by applying a low-pass filter to a discrete signal. That is, the interpolation reconstructs data lost during the sampling process by smoothing data samples using an interpolation function (or an interpolation kernel).

In data arrayed in an equivalent space, the interpolation is represented by Equation 5.

$$f(x) = \sum_{k=0}^{K-1} c_k h(x - x_k) \qquad (5)$$

wherein h is an interpolation kernel having a constant number $C_k$. In reality, h is a symmetric kernel, i.e., h(-x)=h(x).

Figure 17:
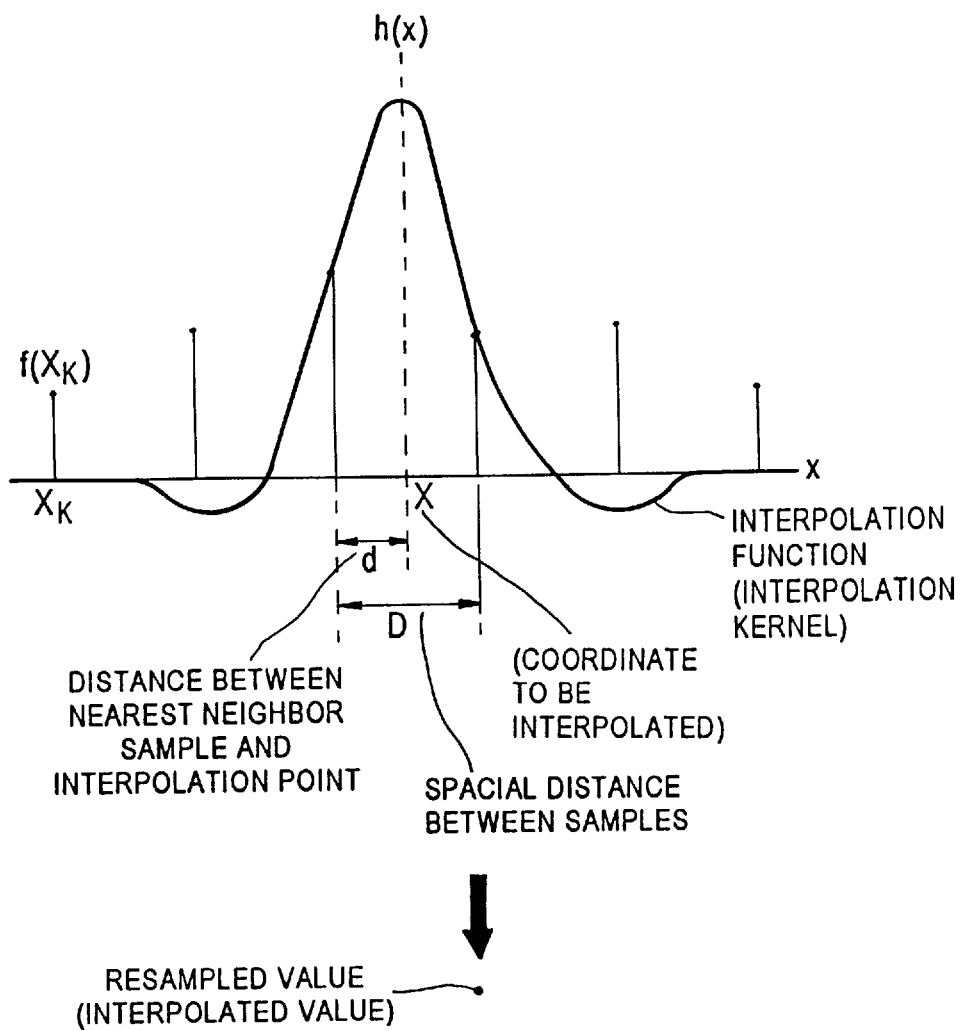
FIG. 17 is a graph showing an example of the interpolation at a single point.

FIG. 17 shows an example of a single point interpolation, wherein x becomes a center of the interpolation kernel and denotes a sampling point to be interpolated. Here, the value x equals the sum of discrete sample values each allocated depending on a corresponding value of the interpolation kernel (see Equation 5). In FIG. 17 showing an interpolation ranging over 4 points, x has an offset by a distance d from a nearest neighbor sample. Here, a sample value of the kernel is adopted in the following conditions: 023 d<1 and h(-d), h(-1-d), h(1-d), h(2-d). h can be represented as a positive term because of its symmetric characteristic. Thus, h(-d) and h(-1-d) can be substituted by h(d) and h(1+d), respectively. If a resampling coordinate was disposed constantly, a fixed point on the interpolation kernel is referred to, thereby easily realizing the interpolation kernel. For a high speed operation, the interpolation kernel is calculated in advance and stored in a look-up table to be applied, and provides a weight, thereby promoting effectiveness. Though the interpolation is defined as a convolution term, an example attained in such a form is almost not generated. An interpolation approximated in a corresponding interpolation polymial expression at a resampling location is applied. The only reason why the interpolation kernel and a convolution process are discussed is to exhibit definiteness in comparing interpolation algorithms. On the other hand, the interpolation polymial expression is for analyzing a kernel for determining achievement of the interpolation algorithms and numerical correctness of the interpolation function.

The interpolation kernels can generally be evaluated by analyzing performances in a passband and a stopband. That the passband has a unit gain of 1 and the stopband has a gain of 0 is referred to as an ideal reconstruction filter. It is typical for an ideal filter to be extremely enlarged in a spacial area. For example, a sinc function is extended infinitely and thus referred to as an infinite impulse response (IIR) filter.

However, the sinc function cannot be physically realized and only an approximation can be attained. The physically attainable IIR filter should use a finite calculating factor. Such a filter is called a recursive filter due to a structural feedback characteristic wherein an output is fed back to an input through a predetermined delay element. A substitute proposal for realizing a filter using a finite element without the feedback operation is a finite impulse response (FIR) filter. In the FIR filter, each output value is output as a weighted sum of a countable number of adjacent input elements. Attention should be given to a fact that the output values are not functions of past output values as in the IIR filter. The IIR filter excels in performance compared to the FIR filter, but is very difficult to design and realize. Therefore, the FIR filter has been the most generally used in the image processing field.

In general, the FIR filter uses an interpolation function such as a box, a triangle, a cubic convolution kernel, a cubic B-spline and a windowed sinc function.

Next, the interpolation kernel will be described.

The interpolation kernel is directly related to the accuracy and computational cost of the interpolation algorithm and becomes an index of the design and evaluation/analysis of the interpolation algorithm. Also, the accuracy and efficiency of the interpolation kernel are in a tradeoff relation.

Here, since a two-dimensional interpolation is only an extension of the result of a one-dimensional interpolation, only the one-dimensional interpolation will be described, and it is presumed that each of the data samples are disposed in an equivalent space by a constant distance D of FIG. 17. In an image reading apparatus such as a scanner, in the case of the main scanning operation, a relative moving speed of a sensor against a manuscript is driven constantly over the entire image as in FIG. 2, and, in the case of the sub-scanning operation, arrangement intervals of the respective light sensing element in the linear sensor are constantly formed as in FIGS. 3A and 3B. Therefore, such a limitation is very realistic and provides a greatly advantageous characteristic for the realization as described above.

First, a nearest neighbor interpolation will be described as follows.

In the nearest neighbor interpolation as the simplest interpolation algorithm in a computational respect, output data to be interpolated is allocated to a nearest neighbor value among input data, and represented in an interpolation polymial Equation 6.

$$f(x) = f(x_k) \quad \frac{X_{k-1} + X_k}{2} < X \leq \frac{X_k + X_{k+1}}{2} \quad (6)$$

Also, a nearest neighbor interpolation kernel is as the following Equation 7.

$$h(x) = \begin{array}{ll} 1 & 0 \leq |x| < 0.5 \\ 0 & 0.5 \leq |x| \end{array} \quad (7)$$

Figure 18:
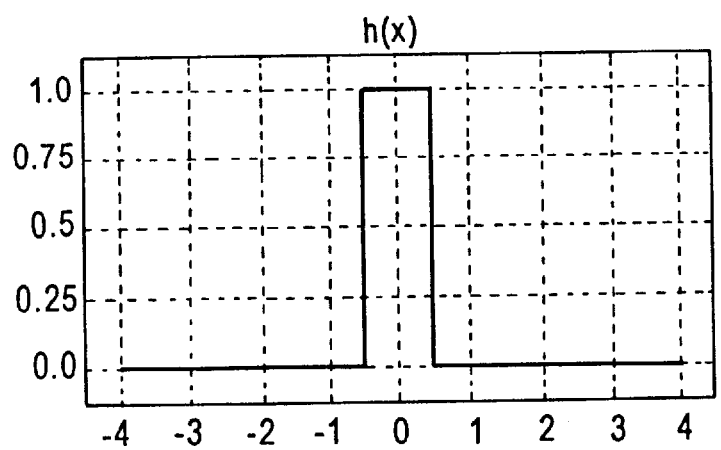
FIG. 18 is a graph showing a nearest neighbor interpolation kernel.
Figure 19:
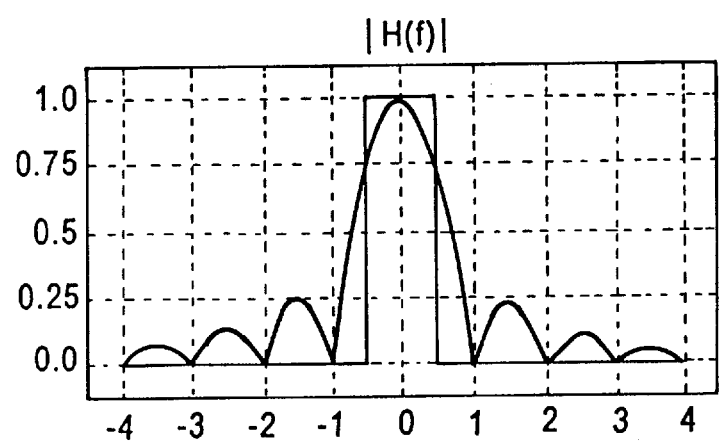
FIG. 19 is a graph showing a Fourier transform of the nearest neighbor interpolation kernel shown in FIG. 18.

As shown in FIG. 18, the nearest neighbor interpolation kernel is obtained by convoluting an image and a rectangular kernel having a width of one pixel in a spatial area. Accordingly, the nearest neighbor interpolation kernel is also called a box-type filter. A Fourier conversion of the nearest neighbor interpolation kernel is the same as shown in FIG. 19. A convolution with a cubic function h in a spacial is equivalent to a multiplication with the sinc function in a frequency area. Thus, as shown in FIG. 18, the nearest neighbor interpolation gets to have an infinite number of side lobes so that a degraded response of the frequency area is shown compared to in an ideal low-pass filter. This method can be realized by repeating adjacent pixels in the case of image magnification and by extracting the pixels in the case of image reduction. This method causes a "blocky" effect to a large scale image. However, since this method is the simplest in a computation as described above so that performance at a very fast speed is possible, this method can be very usefully employed in such an operation as a preview prior to an input of ultimate image data in such a case as an image scanner.

Second, a linear interpolation will be explained as follows.

The linear interpolation is a method for performing an interpolation using a rectilinear function passing successive two points of an input signal. An interpolation polymial expression at the terminal point given as intervals $X_0$ and $X_1$ and function values $f_0$ and $f_1$ is according to the following Equation 8.

$$f(x) = a_1 x + a_0 \quad (8)$$

In Equation 8, $a_0$ and $a_1$ can be obtained through the following matrix.

$$[f_0 \, f_1] = [a_1 \, a_0] \begin{bmatrix} X_0 & X_1 \\ 1 & 1 \end{bmatrix}$$

Accordingly, the interpolation polymial expression is represented by the following Equation 9.

$$f(x) = f_0 + \frac{X - X_0}{X_1 - X_0} (f_1 - f_0) \quad (9)$$

Figure 20:
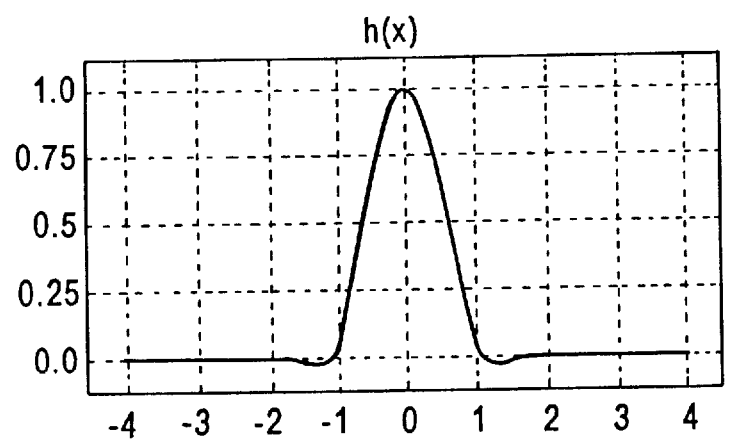
FIG. 20 is a graph showing a linear interpolation kernel.
Figure 21:
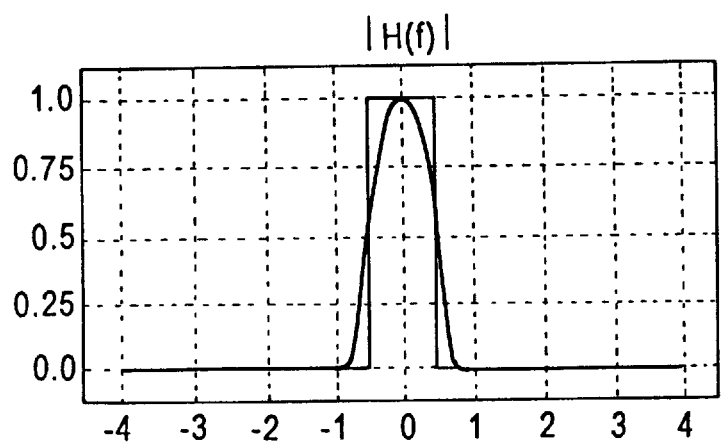
FIG. 21 is a graph showing a Fourier transform of the linear interpolation kernel shown in FIG. 20.
Figure 22:
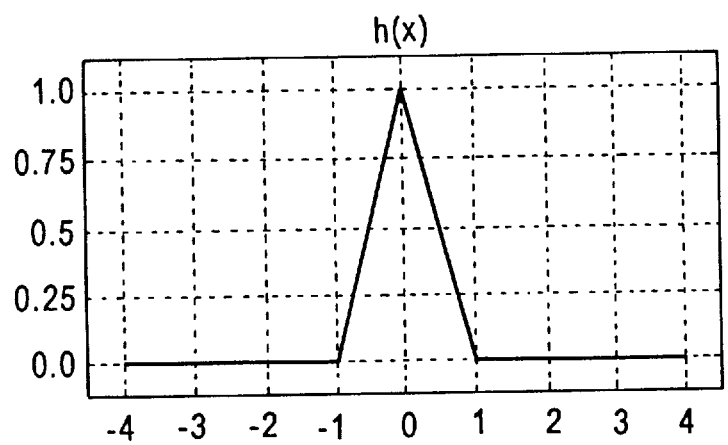
FIG. 22 is a graph showing a cubic convolution interpolation kernel.
Figure 23:
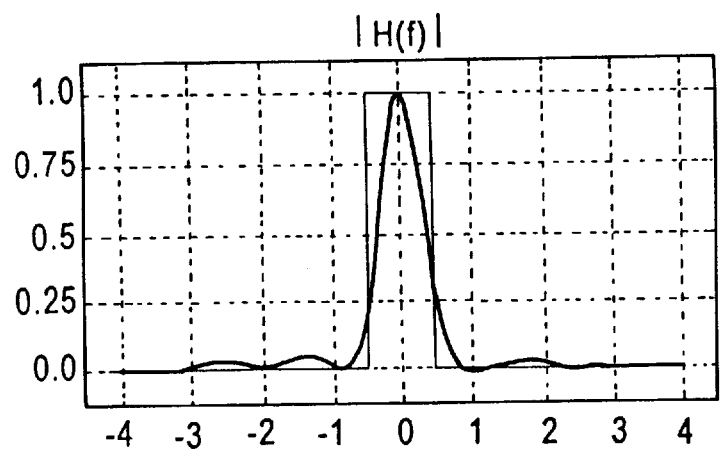
FIG. 23 is a graph showing a Fourier transform of the cubic convolution interpolation kernel shown in FIG. 22.

In order to evaluate an interpolation algorithm of this method, a frequency response feature of the interpolation kernel shown in FIGS. 20 and 21 should be referred to. The linear interpolation in a spacial area equals an adoption of the convolution of the interpolation kernel and a sampled input as shown in the following Equation 10.

$$h(x) = \begin{array}{ll} 1 - |x| & 0 \leq |x| < 2 \\ 0 & 2 \leq |x| \end{array} \quad (10)$$

The kernel h is called a triangle filter or a tent filter due to its shape of a triangle or a tent as shown in FIG. 20. This kernel has a relatively preferable frequency response feature as shown in FIG. 21, and provides a relatively excellent performance compared to the nearest neighbor interpolation. On the other hand, a small passband in a high frequency area may generate aliasing. However, since computational cost and performance are relatively negligible, the kernel is widely used.

Third, a cubic convolution will be explained as follows.

The cubic convolution as a three-order interpolation algorithm can efficiently approximate the sinc function theoretically, wherein an interpolation kernel can be obtained by a typical three-degree curve function. The kernel is constituted as a partial three-degree function in subinterval sections (−2, −1), (−1, 0), (0, 1) and (1, 2). The interpolation kernel becomes 0 except in a section (−2, 2), which is defined by the following Equation 11.

$$h(x) = \begin{bmatrix} a_{30} + |x|^3 + a_{20}|x|^2 + a_{10} + |x| + a_{00} & 0 \leq |x| < 1 \\ a_{31} + |x|^3 + a_{21}|x|^2 + a_{11} + |x| + a_{01} & 1 \leq |x| < 2 \\ 0 & 2 \leq |x| \end{bmatrix} \quad (11)$$

In Equation 11, a coefficient value is determined by applying limitations of the interpolation kernel as follows.

First, h(0) equals 1, and, when |x| equals 1 and 2, h(x) equals 0.

Second, when |x| equals 0.1 and 2, h is successive.

Third, when |x| equals 0.1 and 2, h has a successive first-order derived function.

An interpolation at a data point $X_j$ from the first limitation is defined by the following Equation 12.

$$f(x) = \sum_{k=0}^{K-1} c_k h(X_j - X_k) \quad (12)$$

$$= \sum_{k=j-2}^{j+2} c_k h(X_j - X_k)$$

The following relation expressions can be induced from the first and second limitations.

$0 = h(0) = a_{00}$ $0 = h(1^-) = a_{30} + a_{20} + a_{10} + a_{00}$ $0 = h(1^+) = a_{31} + a_{21} + a_{11} + a_{01}$ $0 = h(2^-) = 8a_{31} + 4a_{21} + 2a_{11} + a_{01}$

The following relation expressions can be induced from the third limitation.

$$-a_{10}=h(0^-)=h(0^+)=a_{10}$$

$$3a_{30}+2a_{20}+a_{10}=h(1^-)=h(1^+)=3a_{31}+2a_{21}+a_{11}$$

$$2a_{31}+4a_{21}+a_{11}=h(2^-)=h(2^{30})=0$$

An interpolation function in the following Equation 13 is obtained from the inducing formula by substituting $a=a_{31}$ for a variable which can be arbitrarily controlled by a user.

$$h(x) = \begin{cases} (a+2)|x|^3 - (a+3)|x|^2 + 1 & 0 \leq |x| < 1 \\ 8a|x|^3 - 5a|x|^2 + 8a|x| - 4a & 1 \leq |x| < 2 \\ 0 & 2 \leq |x| \end{cases} \quad (13)$$

When a kernel feature is induced from the characteristics of an ideal reconstruction filter sinc function, and, in an h function, a concave curve ascends when $|x|$ equals 1 and it descends when x equals 0, a boundary of a is calculated in the cubic convolution kernel by obtaining the following second-order derivative at each point (see FIGS. 20 and 21).

$$h''(0)=-2(a+3)<0$$

$$h''(1)=-4a>0$$

Accordingly, in order to make h have a function similar to the sinc function, a ranges between −3 and 0. Also, it is preferable that a equals −1 to make the inclinations of the sinc function and h similar when x equals 1. However, since a determines a high frequency characteristic of the passband, it can be arbitrarily regulated within the allowable range in order to attain an effect of increasing or decreasing the sharpness of an image.

Next, the operation and configuration of the look-up tables 88 and 98 for housing interpolation kernel data will be described.

In a resampling step due to an image interpolation, the look-up table using a memory means stores a kernel value according to an interpolation algorithm selected to prevent a computational bottle-neck phenomenon for outputting an interpolation kernel at a specific point as a method for increasing speed, and approximates the stored kernel value to a weighted value depending on input image data. At this time, an interpolation point is positioned at the center from the input data on the ground of an inverse mapping to be the center of the interpolation kernel. The interpolation kernel can be divided into coefficient bin in accordance with sections corresponding to intervals between input pixels. That is, the data of the interpolation kernel h is calculated according to each selection kernel function such as Equations 7, 10 and 13, and stored in first and second look-up tables LUT1 and LUT2 of FIG. 14.

A problem of how many interpolation points should be set in the interpolation has the same meaning as a problem how much a value K in the formula 4 should be set, and determines the usefulness of the interpolation algorithm. A problem until how many nearest neighbor pixels will be referred to symmetrically on the basis of an interpolation point can be flexibly applied. However, in this case, four points are applied (see FIG. 17).

As shown in FIG. 17, a section is divided into four, i.e., (−2, −1), (−1, 0), (0, 1) and (1, 2) according to the interpolation kernel. A kernel in each section is called a bin. As described above, since the kernel function is set to be 0 in sections except the section (−2, 2), the look-up table has only to preserve the section data. Also, since the interpolation kernel has symmetrical characteristics, the sections (−2, −1) and (1, 2) and (−1, 0) and (0, 1) are symmetrical to each other on the basis of a coordinate (x=0) to be interpolated. Thus, if this symmetric feature is properly utilized to minimize capacitance of the look-up table, a duplication of the kernel data can be prevented.

Figure 14:
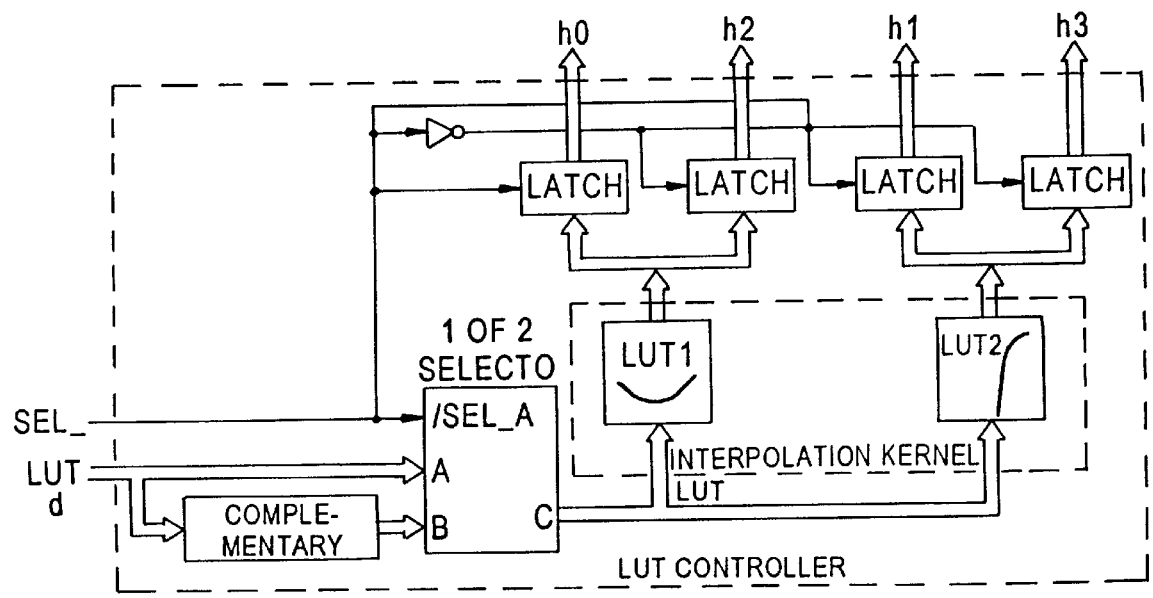
FIG. 14 is a detailed configuration view of the look-up table for housing interpolation kernel data and a control circuit shown in FIGS. 7 and 8.

Accordingly, the first look-up table LUT1 of FIG. 14 has kernel data (LUT1 BIN of FIG. 24) of the section (−2, −1) and the second look-up table LUT2 has kernel data (LUT2 BIN of FIG. 24) of the section (−1, 0). Here, the kernel data of the two look-up tables are disposed to consecutive addresses.

The more the kernel data (kernel samples) there are in each section, the better the correction quality becomes. That is, the number of oversampling positions in the kernel bin is generally referred to as an oversample of a kernel, and 256, 512 or 1024 oversamples are typically employed. Since the number of oversamples is directly linked to the capacitance of the look-up tables, it can be appropriately adopted in accordance with an application object and an allowable circumference. The present description adopts 1024 oversamples for convenience sake. Also, though each kernel data is set to have a 12-bit resolution, it can be realized by increasing and decreasing the resolution as necessary and selected on the ground of efficiency and accuracy of the interpolation algorithm. Accordingly, the entire size of look-up tables in the present invention becomes 12 bits×124 oversamples×2.

Now, the interpolation kernel data and a look-up table address mapping will be described.

Figure 24:
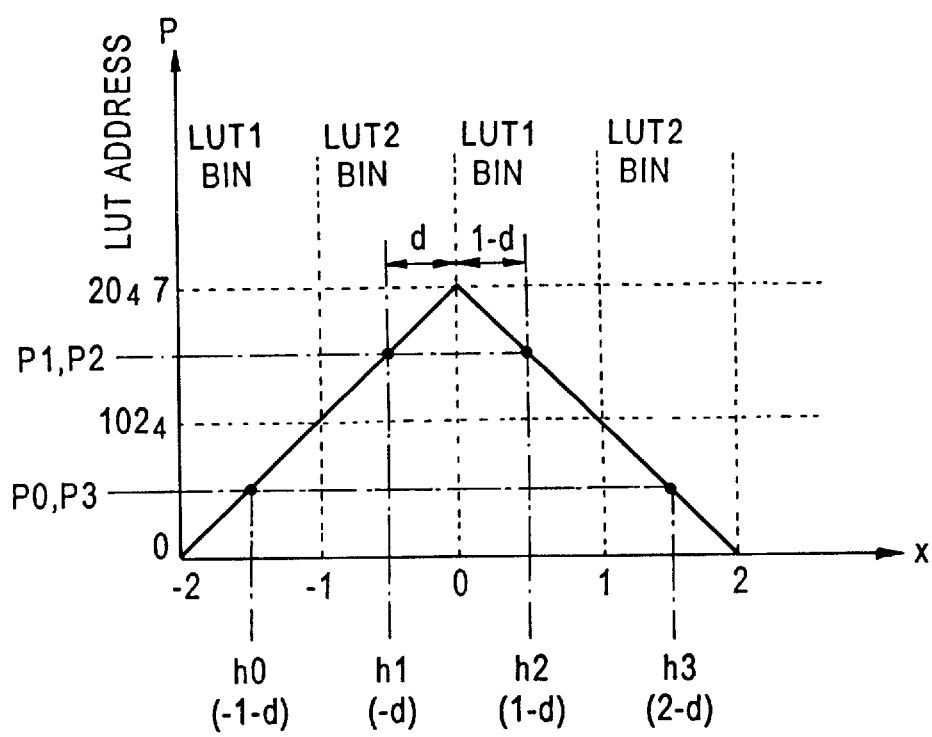
FIG. 24 is a graph showing an address mapping of a look-up table for housing interpolation kernel data, and a position of an interpolating point kernel data.

FIG. 24 shows the relationship between the interpolation kernel data and the look-up table address disposition. As described above, in the present example, a four point interpolation is performed assuming input data disposed at an equivalent interval, and each interpolation kernel bin is set to have 1024 oversampling points in each unit input data interval. A coordinate (x=0) is a point to be interpolated, and this point becomes a center of the interpolation kernel. Accordingly, the interpolation kernel data and the look-up table address are expressed by the following Equations 14 and 15.

$$P = 1024(X+2) \quad -2 \leq X < 0 \quad (14)$$

$$P = 1024(-X+2) \quad 0 \leq X \leq 2 \quad (15)$$

According to these formulas, an interpolation function such as Equations 7, 10 and 13 is output at an interval of $\frac{1}{1024}$ within an x range of −2 to 0 in an example of FIG. 24, and stored at a corresponding address position of the formula 14. The kernel data in an x section between −2 and −1 is stored in the first look-up table LUT1 of FIG. 14, and the kernel data in an x section between −1 and 0 is stored in the second look-up table LUT2. The kernel data in an x section between 0 and 2 does not need an additional look-up table using the symmetry of the kernel data. In the interpolation operation, the kernel data at a position according to Equations 14 and 15 is used in the construction of a circuit of FIG. 14.

If the interpolation function shown by Equation 4 is restricted to the case of four points of FIG. 24, it can be expressed by the following Equation 16.

$$\begin{aligned} f(x) &= C_0h(-1-d) + C_1h(-d) + C_2h(1-d)C_3h(2-d) \\ &= C_0h_0 + C_1h_1 + C_2h_2 + C_3h \end{aligned} \quad (16)$$

wherein $C_0$, $C_1$, $C_2$ and $C_3$ are data values of pixel on right and left sides of an interpolation point as input data, and d is an offset of an interpolation point and a nearest neighbor pixel and has a relationship such as the following Equation 17 depending on a variable magnification.

$$d = M\frac{\delta}{w} - int\left(M\frac{\delta}{w}\right) \quad (17)$$

wherein M is a variable magnification in a vertical direction, i.e., a sub-scanning direction, δ is a distance between image sensors shown in FIGS. 3A and 3B, w denotes a length in the sub-scanning direction of each light sensing element in the same drawing, and an operator int(.) indicates that an integer value is adopted.

The present invention can be applied to a high resolution and high speed scanning apparatus which is employed in a facsimile, an image scanner and a digital duplicator, and more particularly, to a color scanning apparatus.

As described above, in the image reading apparatus having a plurality of line sensors, according to the sensor-to-sensor distance correcting method and the apparatus therefor of the present invention, a geometric image registration error generated on an input image due to a distance between the image sensors is corrected to obtain a high quality image. In particular, the correction method and apparatus according to the present invention can provide a method capable of applying various interpolation functions including a three-dimensional cubic interpolation algorithm which can be approximated to a SINC function having adaptive correction and ideal interpolation characteristics depending on a magnification transformation of the sub-scanning direction.

Furthermore, in a general document image reading apparatus wherein image sensors are moved during a main scanning operation according to a scanning characteristic (i.e., a sub-scanning operation), the degradation of sharpness due to the sub-scan operation can be prevented by using an interpolation kernel look-up table as a memory means in order to adaptively control a weighted value of the interpolation kernel. In the realization of an apparatus of this kind, the interpolation kernel is previously calculated and stored in the look-up table to prevent a computational bottle-neck phenomenon, which makes a high speed operation possible. Also, a circuit for correcting a distance between real-time sensors can be realized through a realistic embodiment.

What is claimed is:

1. A method for correcting a distance between sensors in an image reading apparatus having a plurality of line sensors, the method comprising the steps of:

an extra-line correcting step for correcting a registration error of an integer line unit among distances between sensors by housing sensor data for reading an image at a preceding position on a manuscript using red and green signal delay memories, delaying the housed sensor data until senor data at a next position is read, and reading the delayed sensor data when sensor data at the last position is read; and an intra-line correcting step for correcting a decimal point unit registration error among the distances between sensors in a sub-scan direction using a look-up table for housing interpolation kernel data.

2. The method of claim 1, wherein said intra-line corrector corrects the decimal point unit registration error in the sub-scan direction due to a distance between sensors not correctly corresponding to a scanning line unit according to predetermined scanned conditions or of the sharpness of an image being degraded during a sub-scan, and wherein one of the sensors is minutely moved within a scan line on the basis of the manuscript according to scan characteristics.

3. In an image reading apparatus having a plurality of line sensors including an image sensing means for converting optical image information into an electrical signal, an analog-to-digital converting means for converting a signal from said image sensing means into a digital signal, and a sensor-to-sensor distance correcting means, a circuit for correcting a distance between sensors comprising:

an extra-line corrector for correcting a registration error of an integer line unit among distances between sensors by housing sensor data for reading an image at a preceding position on a manuscript using red and green signal delay memories, delaying the housed sensor data until sensor data at a next position is read, and reading the delayed sensor data when sensor data at the last position is read; and an intra-line corrector for correcting a decimal point unit registration error among the distances between sensors in a sub-scan direction using a look-up table for housing interpolation kernel data.

4. A circuit for correcting a distance between sensors in an image reading apparatus having a plurality of line sensors as claimed in claim 3, wherein said sensor-to-sensor distance correcting means further comprises an address generator for generating an address for controlling a delay memory using a sensor pixel clock signal.

5. A circuit for correcting a distance between sensors in an image reading apparatus having a plurality of line sensors as claimed in claim 3, wherein said intra-line corrector comprises:

a line delay memory;

a data register for arbitrarily storing data output from said line delay memory to perform an interpolation operation;

an interpolation kernel look-up table having said interpolation kernel value;

a kernel register for storing a coefficient value of an interpolation point to be referred according to an interpolation kernel offset; and an operator for performing multiplying and adding operations.

6. A circuit for correcting a distance between sensors in an image reading apparatus having a plurality of line sensors as claimed in claim 5, wherein said interpolation kernel look-up table stores and uses a kernel function in one side section on the basis of an interpolation point considering a characteristic of said kernel function having a symmetric feature on the basis of said interpolation point.

7. In the apparatus of claim 3, wherein said intra-line corrector corrects the decimal point unit registration error in the sub-scan direction due to a distance between sensors not correctly corresponding to a scanning line unit according to predetermined scanned conditions or of the sharpness of an image being degraded during a sub-scan, and wherein one of the sensors is minutely moved within a scan line on the basis of the manuscript according to scan characteristics.

8. In an image reading apparatus having a plurality of line sensors including an image sensing means for converting optical image information into an electrical signal, an analog-to-digital converting means for converting a signal from said image sensing means into a digital signal, and a sensor-to-sensor distance correcting means, a circuit for correcting a distance between sensors comprising:

an extra-line corrector for correcting a registration error of an integer line unit among distances between sensors by housing sensor data for reading an image at a preceding position on a manuscript using red and green signal delay memories, delaying the housed sensor data until sensor data at a next position is read, and reading the delayed sensor data when sensor data at the last position is read; and an intra-line corrector for correcting a decimal point unit registration error among the distances between sensors using a look-up table for housing interpolation kernel data, wherein said sensor-to-sensor distance correcting means further comprises an address generator for generating an address for controlling a delay memory using a sensor pixel clock signal, wherein, in said address generator, an involution value of 2 is called a column-address when the difference between a signal scan line address coefficient value and the number of sensor pixels are the smallest among them of a multiple of an integer of the involution of 2 which is more than or equal to the number of sensor pixels, and, when the integral times of 2 is called the signal line address coefficient value, the multiplied value of the integer value by a value counted in a unit of integral times of a single line address according to a sub-scan control signal within a range below the capacitance of said delay memory is called a low-address.

9. A circuit for correcting a distance between sensors in an image reading apparatus having a plurality of line sensors as claimed in claim 8, wherein said address generator according to a color for correcting a distance between sensors through said delay memory comprises:

a column-address generator for generating said column-address by counting a sensor pixel clock; and a low-address generator for generating said low-address by performing a counting operation in an identical operational cycle according to a carry signal of said column-address generator, wherein each offset address of said column-address generator and said low-address generator is set differently.

10. A circuit for correcting a distance between sensors in an image reading apparatus having a plurality of line sensors as claimed in claim 9, wherein said offset address is generated by counting the number of delay lines determined by a sub-scanning variable magnification and a sensor-to-sensor distance and a sub-scanning control signal.

11. In an image reading apparatus having a plurality of line sensors including an image sensing means for converting optical image information into an electrical signal, an analog-to-digital converting means for converting a signal from said image sensing means into a digital signal, and a sensor-to-sensor distance correcting means, a circuit for correcting a distance between sensors comprising:

an extra-line corrector for correcting a registration error of an integer line unit among distances between sensors by housing sensor data for reading an image at a preceding position on a manuscript using red and green signal delay memories, delaying the housed sensor data until sensor data at a next position is read, and reading the delayed sensor data when sensor data at the last position is read; and an intra-line corrector for correcting a decimal point unit registration error among the distances between sensors using a look-up table for housing interpolation kernel data, wherein said intra-line corrector adaptively controls a reference address value of said interpolation kernel look-up table according to a sub-scanning variable magnification.

12. In an image reading apparatus having a plurality of line sensors including an image sensing means for converting optical image information into an electrical signal, an analog-to-digital converting means for converting a signal from said image sensing means into a digital signal, and a sensor-to-sensor distance correcting means, a circuit for correcting a distance between sensors comprising:

an extra-line corrector for correcting a registration error of an integer line unit among distances between sensors by housing sensor data for reading an image at a preceding position on a manuscript using red and green signal delay memories, delaying the housed sensor data until sensor data at a next position is read, and reading the delayed sensor data when sensor data at the last position is read; and an intra-line corrector for correcting a decimal point unit registration error among the distances between sensors using a look-up table for housing interpolation kernel data, wherein said intra-line corrector comprises:

a line delay memory;

a data register for arbitrarily storing data output from said line delay memory to perform an interpolation operation;

an interpolation kernel look-up table having said interpolation kernel value;

a kernel register for storing a coefficient value of an interpolation point to be referred according to an interpolation kernel offset; and an operator for performing multiplying and adding operations, wherein the number of said registers is set to be the same as that of interpolation points according to a selected interpolation algorithm, and each of said resistors performs a shift according to an interpolation operation.

13. A circuit for correcting a distance between sensors in an image reading apparatus having a plurality of line sensors as claimed in claim 12, wherein an input of a kernel value with respect to said kernel register is performed one time in an initializing step, said sensor pixel clock is cyclically-shifted according to a shift clock having a cycle multiplied by the number of selected interpolation points, and corresponding data with respect to said data register is simultaneously input according to said sensor pixel clock and shifted according to said shift clock.

* * * * *